June 18, 1940. H. C. HENZE 2,204,757
SAFETY VALVE
Filed Jan. 20, 1938 2 Sheets-Sheet 1
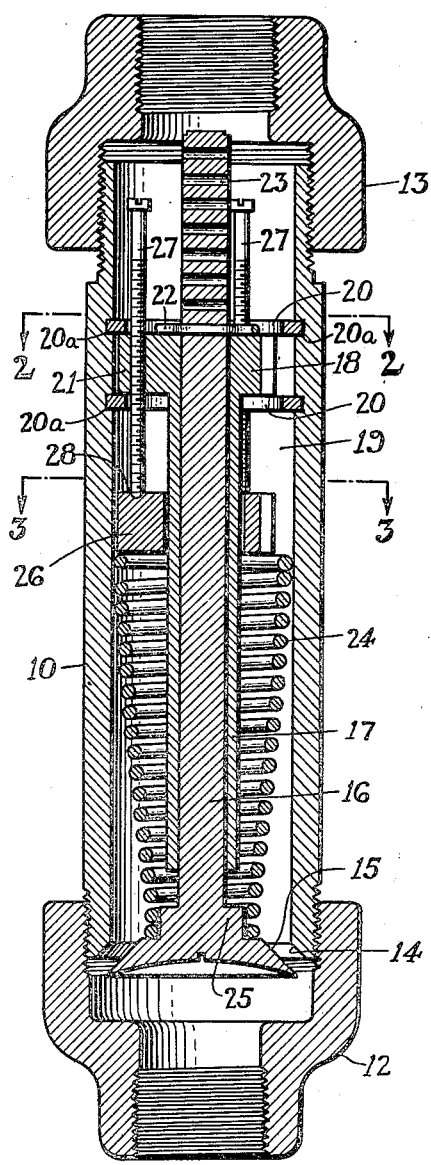
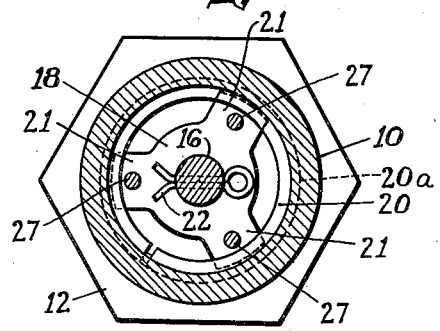
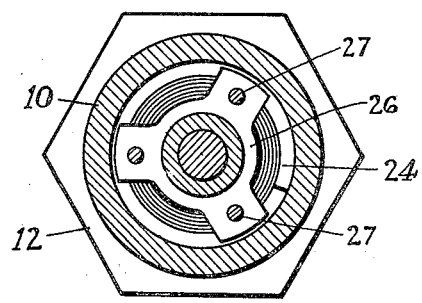
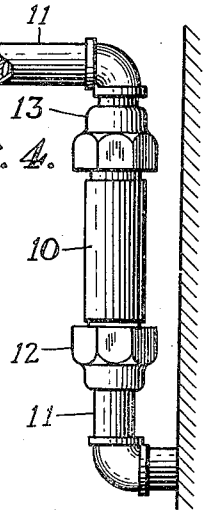
INVENTOR
HENRY C. HENZE
BY
Richards & Geier
ATTORNEYS June 18, 1940.  H. C. HENZE  2,204,757
SAFETY VALVE
Filed Jan. 20, 1938  2 Sheets-Sheet 2

INVENTOR
HENRY C. HENZE
BY
Richards & Geier
ATTORNEYS

Patented June 18, 1940

2,204,757

UNITED STATES PATENT OFFICE 2,204,757

SAFETY VALVE

Henry C. Henze, Linden, N. J.

Application January 20, 1938, Serial No. 185,804

5 Claims. (Cl. 137—152)

This invention relates to safety valves and the like and, more particularly, to an automatic shut-off valve for steam pipes and the like to prevent escape of steam or other fluid in the event of rupture.

One of the principal objects of the invention is to devise a simple, cheap and reliable shut-off valve which may easily be inserted into a pipeline and which will immediately and automatically shut off the flow of fluid in the event of rupture beyond the valve and seal the pipe against leakage until the break has been repaired.

Another object is to provide a shut-off valve of the character indicated in which the valve seat clearance as well as the responsiveness of the valve may be adjusted according to the pressure in the pipe.

Other objects and advantages inherent in the invention will become apparent as the specification proceeds and when taken in conjunction with the accompanying drawings which illustrate a preferred embodiment together with modification thereof.

In the drawings:

Figure 1 is a vertical section of a shut-off valve according to the invention;

Figure 2 is a section along the line 2—2 of Figure 1;

Figure 3 is a section along the line 3—3 of Figure 1;

Figure 4 is an elevational view of the valve inserted into the pipe line;

Figure 5:
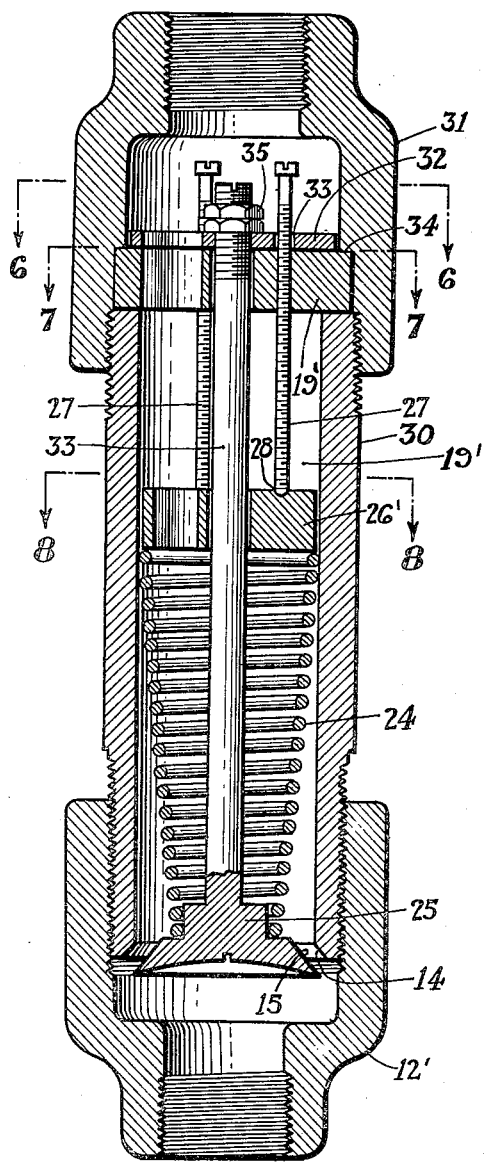
Figure 5 is a vertical section of a modification.

Referring in detail to Figures 1 to 4, inclusive, the device of this application consists of a valve comprising a casing 10, forming a valve chamber 19, the ends of which are reduced and screwthreaded to receive the screwthreaded collars 12 and 13 which serve to connect the valve to the pipe line 11.

One end of the casing 10 is machined to form valve seat 14 for receiving the valve head 15 which has a bevelled periphery to conform to the bevelled surface of the valve seat so that it may be closed tightly thereagainst to prevent any escape of steam or fluid.

The valve head 15 has preferably a concave outer surface to center the pressure directly on the head. It is provided with a stem 16 which works into sleeve 17. This sleeve is preferably made integral with the spider 18 which forms a bearing for the valve stem 16.

The spider 18 is held in position within the valve chamber 19 by means of snap-rings 20 against which legs 21 of the former abut. The snap-rings, in turn, rest in grooves 20a on the interior walls of the valve casing.

The valve clearance may be adjusted by raising or lowering valve stem 16 in the spider 18 by means of a cotterpin 22 inserted into perforations 23 of the valve stem.

A spiral compression spring, or the like, 24 encircles the valve stem 16 and the sleeve 17 and is mounted at one extremity on the head 25 of the valve stem and engaging at the other end the spider 26 which is freely reciprocable within the valve chamber 19.

The tension of the spring 24 may be adjusted by means of set-screws 27 which engage the screwthreaded bores of the legs 21 of the spider 18 and abut against recession 28 on the spider 26. This spring normally holds the valve head 15 in open position and permits of adjustment to different pressures. In operation the steam or other fluid passes from the pipe line 11 into the collar 12, through the opened valve seat and the valve chamber and to the other end of the pipe line through the collar 13. Under normal operating conditions the tension of the spring 24 is adjusted to withstand the normal pressure. However, should a rupture occur beyond the collar 13 on the pipe line, the suddenly reduced pressure, or partial vacuum, will close the valve head 15 tightly against the valve seat 14, thus preventing a further flow of fluid. In this manner, the pipe line is sealed against leakage. As soon as the pressure has again been balanced after repair of the rupture the valve head will resume its open position and permit further flow.

The invention, therefore, contemplates a yielding valve tending to close under the shock of a rupture and which may be adjusted to different pressures.

Figure 6:
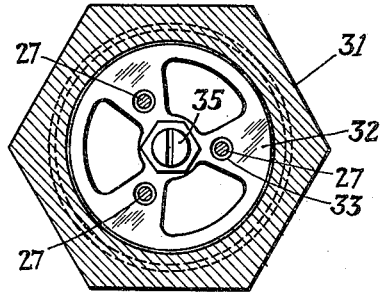
Figure 6 is a section along the line 6—6 of Figure 5.
Figure 7:
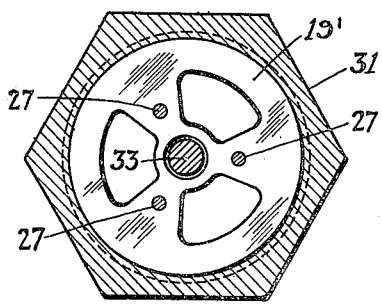
Figure 7 is a section along the line 7—7 of Figure 5.
Figure 8:
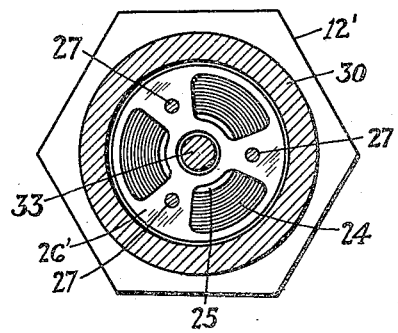
Figure 8 is a section along the line 8—8 of Figure 5.

The modification illustrated in Figures 5 to 8, inclusive, are in all major aspects identical with the form shown in the Figures 1 to 4. However, instead of resting on snap-rings, the spider 19' rests on top of the casing 30 and is held in position by means of the collar 31 which is provided with a shoulder 34 which clamps the spider against the casing. The valve stem 33 is screwthreaded at its upper end and engages the washer 32 which rests loosely on the spider 19'. The washer 32 has the same configuration or contour as the spider 29 and is provided with bores or openings 33 in which the set-screws 27 ride freely. The set-screws 27 threadedly engage the spider 19' and abut against the spider 26' in the same manner as in the modification shown in Figure 1. The operation of this modification is also identical with the operation of the embodiment shown in Figure 1 with the exception that a finer adjustment of the valve clearance can be obtained by virtue of the screw-threaded engagement between the valve stem and the washer 32.

It is to be understood that the invention is not necessarily limited to the exact embodiments illustrated. Other various forms and modifications may readily be resorted to without departing from the spirit of the invention.

What is claimed is:

1. An automatic shut-off valve of the character indicated adapted to be inserted into a pipe line comprising a casing provided with a valve seat, a valve head having a stem reciprocably mounted within said casing, guide means for said stem, a helical spring encircling said valve stem for normally maintaining said valve head in an unseated position and engaging at one end said valve head, a spider freely reciprocable in said casing engaging the other end of said spring, set-screws engaging said guide means and said spider for adjusting the tension of said spring and means enabling manual longitudinal adjustment of said valve stem with respect to said guide means whereby the valve clearance may be regulated.

2. An automatic shut-off valve of the character indicated adapted to be inserted into a pipe line comprising a casing provided with a valve seat, a valve head having a stem reciprocably mounted within said casing and having its free end screwthreaded, guide means for said stem, a helical spring encircling said valve stem for normally maintaining said valve head in an unseated position and engaging at one end said valve head, a spider freely reciprocable in said casing engaging the other end of said spring, set-screws engaging said guide means and said spider for adjusting the tension of said spring and a screwthreaded washer normally resting freely on said guide means and engaging said screwthreaded end of the stem whereby the valve clearance may be regulated.

3. A shut-off valve comprising a casing, a valve seat in said casing, a valve head having a valve stem reciprocably mounted within said casing and having its free end screwthreaded, guide means for said stem, and a helical spring encircling said valve stem and engaging said valve head at one end, a freely reciprocable disc engaging the other end of said spring, set-screws engaging said guide means and abutting against said disc for spacing said disc from said guide means whereby the tension of said spring may be adjusted, and a screwthreaded washer normally resting freely on said guide means and engaging said screwthreaded end of the stem whereby the valve clearance may be regulated.

4. An automatic shut-off valve of the character indicated adapted to be inserted into a pipe line comprising a casing, a valve seat and a normally unseated valve head within said casing, guide means in said casing for said valve head, a reciprocable spider between said valve head and said guide means, resilient means one end thereof engaging said valve head, the other end engaging said spider whereby said valve head will be maintained in unseated position during the normal operation of the valve, regulatable means for spacing said spider with respect to said guide means for tensioning said resilient means, and separate means for enabling manual adjustment of the clearance between said valve head and said valve seat.

5. An automatic shut-off valve of the character indicated adapted to be inserted into a pipe line comprising a casing having a valve seat, and a normally unseated valve head having a valve stem, guide means for said valve stem, a spider between said valve head and said guide means freely reciprocable with respect to said valve stem, a helical spring encircling said valve stem for normally maintaining said valve head in unseated position firmly associated at one end with said valve head and the other end engaging said reciprocable spider, regulatable means for adjusting the spacing of said spider from said guide means to adjust the tension of said resilient means, and separate means for enabling manual adjustment of the clearance between said valve head and said valve seat.

HENRY C. HENZE.